(12) United States Patent
Hosokawa et al.

(10) Patent No.: US 10,903,775 B2
(45) Date of Patent: Jan. 26, 2021

(54) POWER TOOL

(71) Applicant: Hitachi Koki Co., Ltd., Tokyo (JP)

(72) Inventors: Nobuhito Hosokawa, Hitachinaka (JP); Naoki Tadokoro, Hitachinaka (JP)

(73) Assignee: Koki Holdings Co., Ltd., Tokyo (JP)

( * ) Notice: Subject to any disclaimer, the term of this patent is extended or adjusted under 35 U.S.C. 154(b) by 469 days.

(21) Appl. No.: 14/439,083

(22) PCT Filed: Oct. 23, 2013

(86) PCT No.: PCT/JP2013/078690
§ 371 (c)(1),
(2) Date: Apr. 28, 2015

(87) PCT Pub. No.: WO2014/069302
PCT Pub. Date: May 8, 2014

(65) Prior Publication Data
US 2015/0349695 A1 Dec. 3, 2015

(30) Foreign Application Priority Data
Oct. 31, 2012 (JP) .................................. 2012-240869

(51) Int. Cl.
*B24B 23/02* (2006.01)
*H02P 29/02* (2016.01)
(Continued)

(52) U.S. Cl.
CPC ............. *H02P 29/02* (2013.01); *B23B 45/02* (2013.01); *B24B 23/02* (2013.01); *B24B 49/16* (2013.01); *B25F 5/00* (2013.01)

(58) Field of Classification Search
USPC .......................................................... 173/2
See application file for complete search history.

(56) References Cited

U.S. PATENT DOCUMENTS 7,119,516 B2   10/2006   Dennning
7,385,795 B2    6/2008   Denning
(Continued)

FOREIGN PATENT DOCUMENTS

CN   1694330 A   11/2005
CN   1862909 A   11/2006
(Continued)

OTHER PUBLICATIONS

Extended European Search Report for patent application EP13851786.7 (dated Jul. 8, 2016).
(Continued)

*Primary Examiner* — Michelle Lopez
*Assistant Examiner* — Chinyere J Rushing-Tucker
(74) *Attorney, Agent, or Firm* — Kilpatrick Townsend & Stockton LLP

(57) ABSTRACT

It is an object of the invention to provide a power tool capable of performing a control process for avoiding an operation of a protection function for protecting a motor against an overload, unlike the conventional power tool. The control unit detects current I flowing in the motor and determines whether current I exceeds I1 or not (S2). When current I exceeds I1 (S2: Yes), the control unit starts a duty ratio adjustment mode. When current I exceeds Imax (S4: Yes), the control unit accords a protection priority over the adjustment of the duty ratio and stops supplying power to the motor (S5). If current I does not exceed Imax (S4: No), the duty ratio is decreased (S7). When current I becomes lower than I2 (S8: Yes), the control unit increases the duty ratio (S10).

10 Claims, 8 Drawing Sheets

(51) Int. Cl.
  *B25F 5/00* (2006.01)
  *B24B 49/16* (2006.01)
  *B23B 45/02* (2006.01)

(56) References Cited

U.S. PATENT DOCUMENTS

| | | | |
|---|---|---|---|
| 7,521,892 B2 | 4/2009 | Funabashi et al. | |
| 7,538,503 B2 | 5/2009 | Machens et al. | |
| 7,719,234 B2 | 5/2010 | Carrier et al. | |
| 8,931,576 B2 | 1/2015 | Iwata | |
| 2005/0073282 A1* | 4/2005 | Carrier | B25F 5/00 320/106 |
| 2005/0248309 A1 | 11/2005 | Denning et al. | |
| 2005/0248318 A1 | 11/2005 | Denning et al. | |
| 2005/0248320 A1* | 11/2005 | Denning | B25F 5/00 320/141 |
| 2007/0000676 A1* | 1/2007 | Arimura | B25B 21/02 173/179 |
| 2007/0019933 A1* | 1/2007 | Phillips | H02P 29/02 388/804 |
| 2007/0097566 A1 | 5/2007 | Woods et al. | |
| 2008/0203995 A1 | 8/2008 | Carrier et al. | |
| 2009/0096401 A1* | 4/2009 | Watabe | B25F 5/00 318/446 |
| 2009/0139847 A1* | 6/2009 | Yoon | D06F 39/005 200/5 A |
| 2009/0295313 A1* | 12/2009 | Suzuki | B25F 5/00 318/139 |
| 2010/0027979 A1* | 2/2010 | Matsunaga | H02P 6/06 388/811 |
| 2010/0307782 A1* | 12/2010 | Iwata | B25F 5/00 173/1 |
| 2011/0203821 A1* | 8/2011 | Puzio | B25B 23/0064 173/1 |
| 2011/0284255 A1* | 11/2011 | Ookubo | B23B 45/02 173/109 |
| 2011/0284256 A1* | 11/2011 | Iwata | B25F 5/00 173/176 |
| 2012/0024552 A1* | 2/2012 | Kawano | A01D 69/02 173/2 |
| 2012/0152583 A1* | 6/2012 | Yanagihara | B23D 47/12 173/217 |
| 2012/0191250 A1* | 7/2012 | Iwata | B25F 5/00 700/275 |
| 2012/0234573 A1* | 9/2012 | Suda | B25F 5/00 173/217 |
| 2013/0014967 A1* | 1/2013 | Ito | B25F 5/00 173/93 |
| 2013/0049643 A1* | 2/2013 | Kusakawa | B25F 5/00 318/9 |
| 2013/0193881 A1* | 8/2013 | Muto | B25F 5/00 318/139 |
| 2013/0300333 A1* | 11/2013 | Sako | B25F 5/00 318/490 |

FOREIGN PATENT DOCUMENTS

| | | |
|---|---|---|
| CN | 1864300 A | 11/2006 |
| CN | 101060306 A | 10/2007 |
| CN | 201222872 Y | 4/2009 |
| CN | 101599740 A | 12/2009 |
| CN | 102248522 A | 11/2011 |
| CN | 102347699 A | 2/2012 |
| JP | 2010-012547 A | 1/2010 |
| JP | 2012-130980 A | 7/2012 |
| WO | WO2012/108415 A | 8/2012 |

OTHER PUBLICATIONS

China Intellectual Property Office office action for application 201380056399.9 dated Dec. 29, 2016.
International Report on Patentability for application PCT/JP2013/078690 (dated May 14, 2015), 7 pages.
International Search Report for application PCT/JP2013/078690 (dated Nov. 19, 2013).
China Intellectual Property Office office action for patent application 201380056399.9 (dated Dec. 2, 2015).

* cited by examiner

POWER TOOL

TECHNICAL FIELD

The invention relates to a power tool such as a grinder, a drill and the like.

BACKGROUND ART

Generally, power tools have an overload protection function for protecting a motor from being applied with an overload. With the function, the motor is stopped when a load imposed upon the motor exceeds a threshold value, thereby preventing the motor and other components from being burned out.

CITATION LIST

Patent Literature

PTL 1: Japanese Patent Application Publication No. 2010-12547

SUMMARY OF INVENTION

Technical Problem

The above-described protection function adversely lowers working efficiency, as the power tool having been driven is abruptly stopped and the user is obliged to interrupt the work with the power tool.

In view of the foregoing, it is an object of the invention to provide a power tool capable of performing a control process for avoiding the operation of the overload protection function for protecting the motor against the overload, unlike the conventional power tool.

Solution to Problem

According to one aspect of the invention, a power tool may include a motor and a control section configured to control the motor. The control section may be configured to decrease a duty ratio of voltage applied to the motor when a load imposed upon the motor exceeds a first threshold value.

The control section may be configured to increase the duty ratio when the load once having exceeded the first threshold value thereafter decreases below a second threshold value lower than the first threshold value.

According to another aspect of the invention, a power tool may include a motor and a control section configured to control the motor. The control section may be configured to start a duty ratio adjustment mode when a load imposed upon the motor exceeds a first threshold value. The duty adjustment mode adjusts a duty ratio of voltage applied to the motor so that voltage falls within a target load range lower than the first threshold value.

The control section may be configured to finish the duty ratio adjustment mode when the load imposed upon the motor becomes less than a second threshold value lower than the first threshold value during operation in a prescribed duty ratio.

The control section may be configured to monitor the load while referring to at least one of current flowing in the motor and a combination of the duty ratio and number of rotations of the motor.

The control section may be configured to stop supplying the current to the motor when the load exceeds an overload protection threshold value set for protecting the motor against an overload. The overload protection threshold value is larger than the first threshold value.

Of the above-described components, arbitrarily selected combinations should be understood as embodiments of the invention. Also, the inventions expressed in the form of a method and a system should also be understood as defining the invention in view of different aspects insofar as the invention expressed in the form of a system is rewritten into a method, and vice versa.

Advantageous Effects of Invention

The invention provides a power tool capable of performing a control process for avoiding an operation of an overload protection function for protecting a motor against an overload, unlike the conventional power tool.

DESCRIPTION OF EMBODIMENTS

Figure 1:
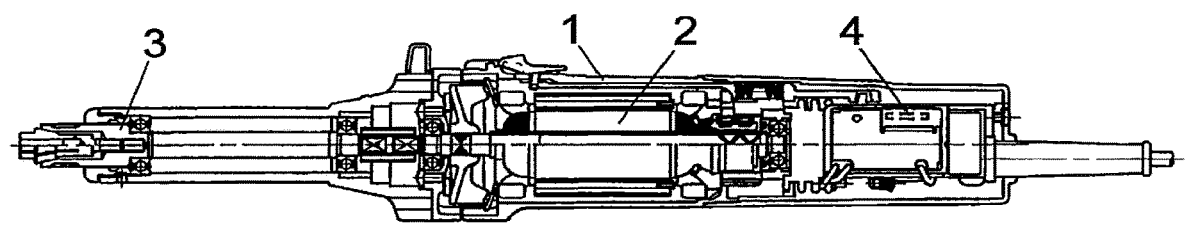
FIG. 1 is a diagram showing an internal structure of a power tool according to a first embodiment of the invention.

Preferred embodiments of the present invention will be described below in detail while referring to the drawings. Also, like parts and components illustrated in each drawing are designated by the same reference numerals to avoid duplicating description. Note that the preferred embodiments are exemplifications and do not limit the present invention, all features and combinations of selected features described in the preferred embodiments are not necessarily a substance of the present invention.

FIG. 1 is a diagram illustrating an internal structure of a power tool according to a first embodiment of the present invention. A straight grinder is exemplified as the power tool, which is driven by electrical power supplied from a commercial power supply. The power tool has a housing 1 and a motor 2 fixingly positioned in an inner space of the housing 1. The motor 2 has a distal end coupled to a spindle 3. The spindle 3 has a tip end to which a grindstone (not illustrated) is attached. The motor 2 is an AC motor with brushes. Rotations of the motor 2 rotate the grindstone to implement grinding operation. The power tool includes a shunt resistor 4 provided for detecting current (load). Since this kind of configuration is well-known, further detailed description is omitted herein.

Figure 2:
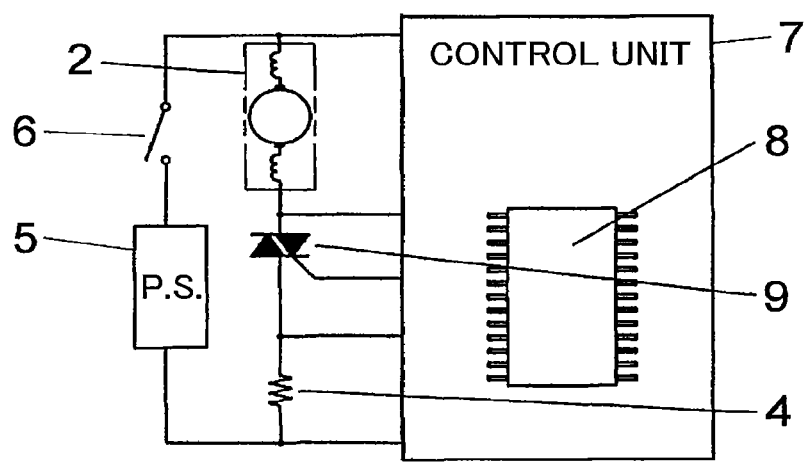
FIG. 2 is a circuit diagram for the power tool shown in FIG. 1.

FIG. 2 is a circuit diagram for the power tool illustrated in FIG. 1. A power supply 5 is an AC power supply such as a commercial power supply. Also, the power supply 5 is connectable to the power tool by a cable. A switch 6 is a user-operated switch which is switched on/off by a user. A triac 9 is an example of a semiconductor device for controlling supply of power to the motor 2. The shunt resistor 4 converts current flowing in the motor 2 into voltage. The motor 2, the triac 9 and the shunt resistor 4 are connected in series between terminals of the power supply 5. A control unit 7 outputs a signal to the gate of the triac 9 to control durations of on or off state in accordance with a prescribed duty ratio. Also, the control unit 7 detects (monitors) current flowing in the motor 2, that is, load (torque) using voltage developed between terminals of the shunt resistor 4. Various kinds of calculations in the control unit 7 are implemented by an arithmetic element 8.

Figure 3:
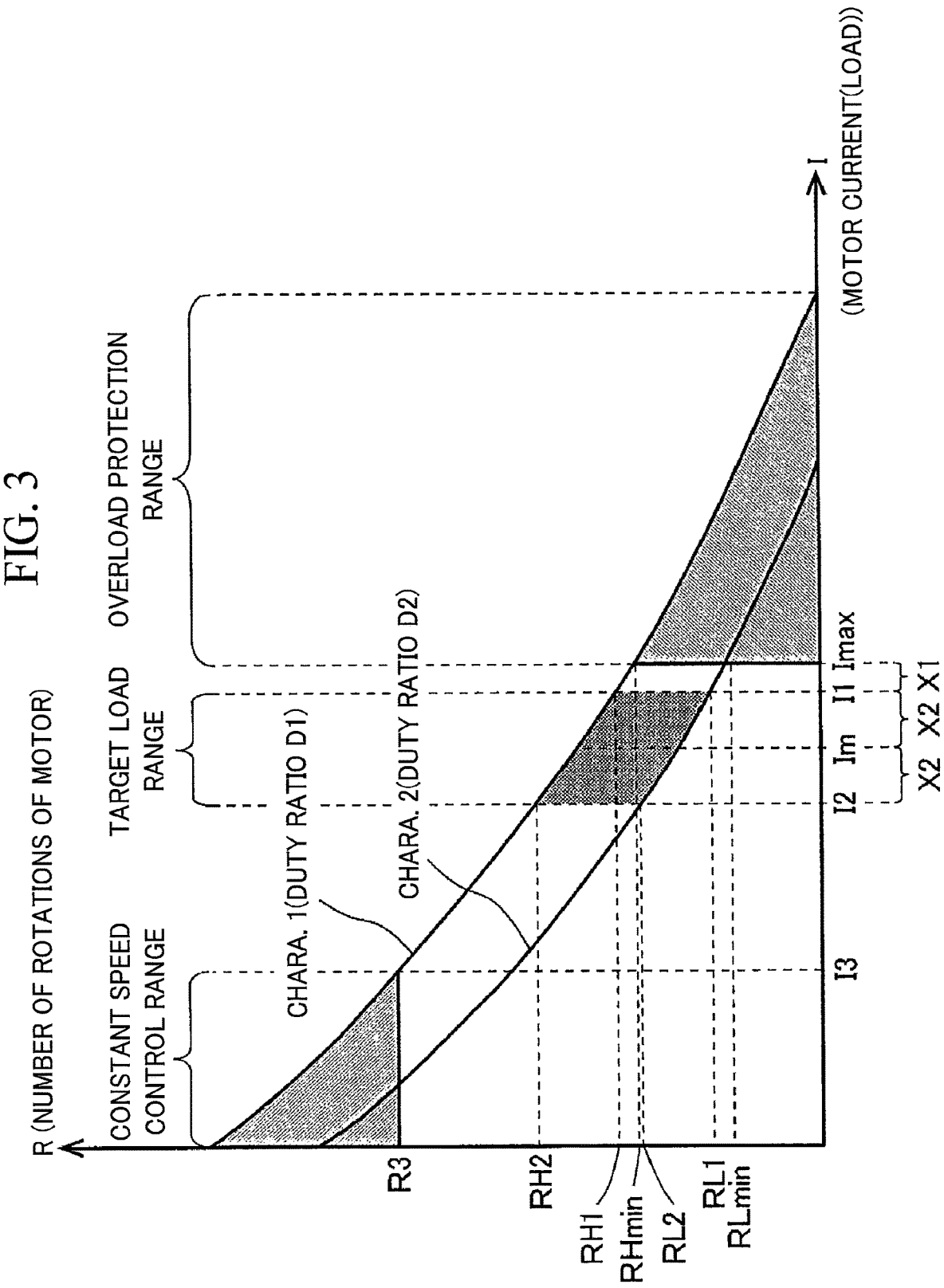
FIG. 3 is a characteristic diagram showing a relationship between a number of rotations of a motor and current flowing in the motor of the power tool shown in FIG. 1.

FIG. 3 is a characteristic diagram illustrating a relationship between the number of rotations of the motor and current flowing in the motor of the power tool. In FIG. 3, the vertical axis represents the number of rotations R of the motor 2, and the horizontal axis current I flowing in the motor 2, that is, load. Characteristic curve 1 is given when a duty ratio is D1 (for example 100%) and characteristic curve 2 is given when the duty ratio is D2 (D2<D1). As shown in FIG. 3, under a constant duty ratio, decreasing the number of rotations R of the motor 2 results in increasing current I flowing in the motor 2. Note that a region in which current I exceeds Imax (an overload protection threshold value) is an overload protection range, and the control unit 7 stops the motor 2 when current I exceeds Imax. Also, a region in which current I is equal to or lower than I3 is a constant speed control range, the control unit 7 controls the number of rotations R so as not to exceed R3.

Figure 4:
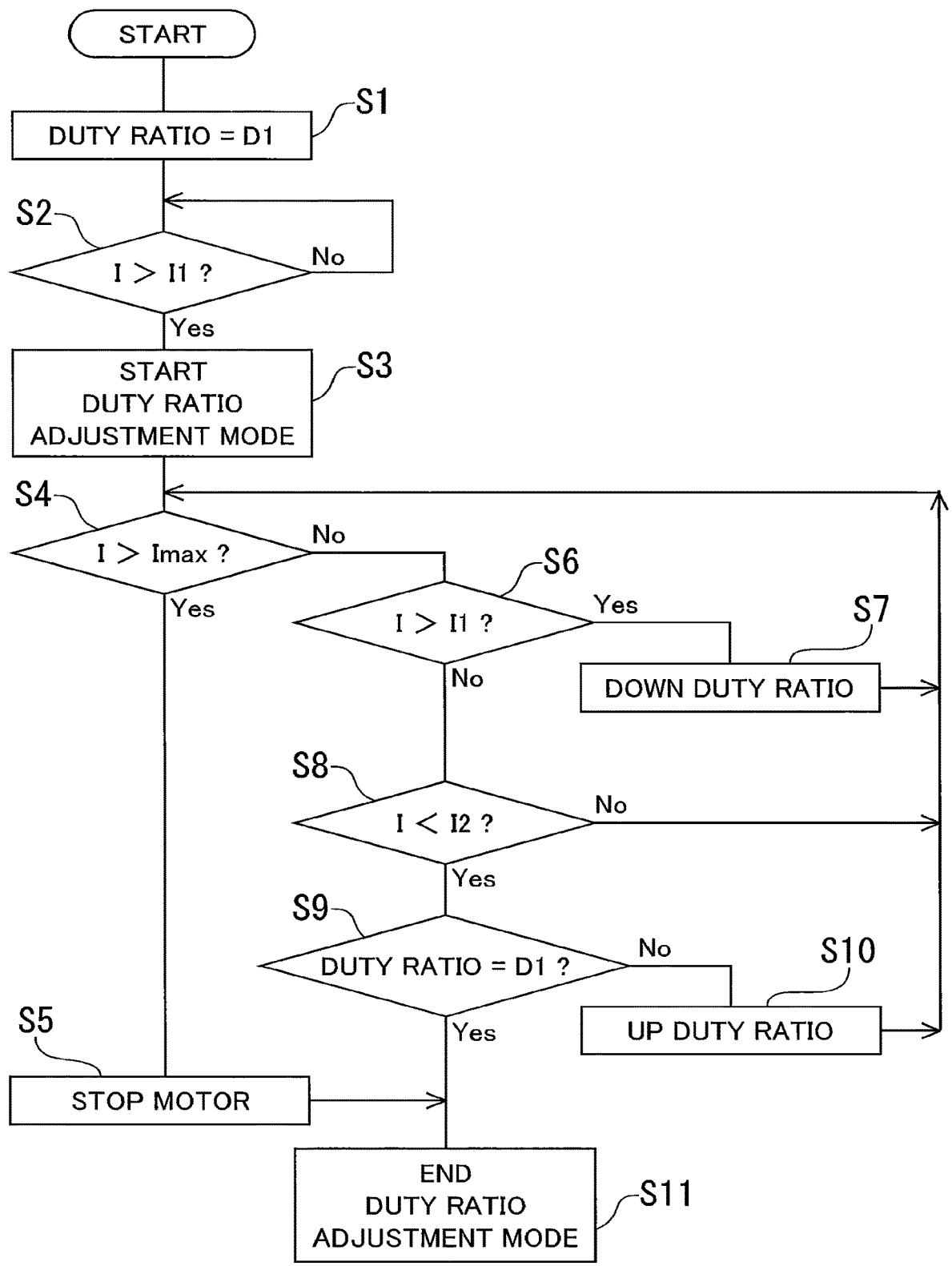
FIG. 4 is a flowchart illustrating a control process for the power tool shown in FIG. 1.

FIG. 4 is a flowchart illustrating steps in control process performed by the power tool illustrated in FIGS. 1 and 2. The steps in control process performed by the control unit 7 will be described below while referring to FIG. 4 as well as FIG. 3. The switch 6 of the power tool is rendered on by a user, and then a work is started. The control unit 7 detects (monitors) current I flowing in the motor 2 using voltage developed between terminals of the shunt resistor 4 while driving the motor 2 at the duty ratio D1, and determines whether current I exceeds I1 or not (S2). I1 is a first threshold value, and a relational expression of I1=Imax−X1 is established. A value of X1 can be set to an arbitrarily selected value in advance. When current I exceeds I1 (S2: Yes), the control unit 7 starts a duty ratio adjustment mode (S3).

In the duty ratio adjustment mode, a duty ratio of voltage applied to the motor 2 is adjusted so that current I falls within a target load range, that is, I2≤I≤I1. A target load central value Im satisfies a relational expression of Im=I1−X2. I2 is a second threshold value, and a relational expression of I2=Im−X2 is established. A value of X2 can be set to an arbitrarily selected value in advance. In the duty ratio adjustment mode, when current I exceeds Imax (S4: Yes), the control unit 7 accords a protection priority over the adjustment of the duty ratio and thus stops supplying power to the motor 2 (S5). If current I does not exceed Imax (S4: No), the control unit 7 determines whether current I exceeds I1 or not (S6). If current I exceeds I1 (S6: Yes), for example, the duty ratio is decreased from D1 to D2 (S7). Then, the characteristic of the motor 2 illustrated in FIG. 3 transitions from the characteristic curve 1 to the characteristic curve 2, and both the number of rotations of the motor 2 and current flowing in the motor 2 become lower. This lowering of the number of rotations of the motor 2 enables the user to recognize a state where current I is nearly overload. Thus, for example, the user can weaken a force for pressing the grindstone against a workpiece to lower the load.

When current I becomes lower than I2 (S8: Yes), the control unit 7 determines whether the duty ratio is D1 or not (S9). If the duty ratio is not D1 (S9: No), for example, the control unit 7 increases the duty ratio from D2 to D1 (S10). Then, the characteristic of the motor 2 illustrated in FIG. 3 transitions from the characteristic curve 2 to the characteristic curve 1, and both the number of rotations of the motor 2 and current flowing in the motor 2 increase. This increase of the number of rotations of the motor 2 makes the user recognize that there is room to increase the load. Thus, for example, the user can strengthen the force for pressing the grindstone against the workpiece to increase the load. As described above, in the duty ratio adjustment mode, when current I exceeds I1, the duty ratio is decreased from D1 to D2, and when current I is lower than I2, the duty ratio is increased from D2 to D1. Thus, the control unit 7 controls the motor 2 so that the load imposed upon the motor 2 falls within the target load range. The duty ratio adjustment mode is ended (S11) when current I exceeds Imax and when current I is lower than I2 at the duty ratio D1.

According to the present embodiment, the following advantages can be obtained.

(1) Since the duty ratio of voltage applied to the motor 2 is decreased before current flowing in the motor 2 reaches the overload protection threshold value, the enablement of overload protection function can be avoided. Accordingly, work efficiency is more enhanced as compared with a case without performing such control.

(2) Since the duty ratio is controlled so that current I falls within the preset target load range in the duty ratio adjustment mode, the finish of the operation can be performed more uniformly as compared with a case without performing such control. For example, when the load is increased excessively, scorching may be generated depending on the material of the workpiece. However, in the present embodiment, this problem can be solved suitably.

Figure 5:
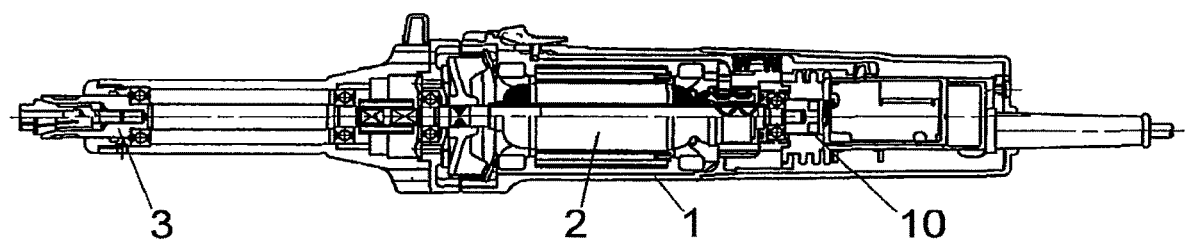
FIG. 5 is a diagram showing an internal structure of a power tool according to a second embodiment of the invention.
Figure 6:
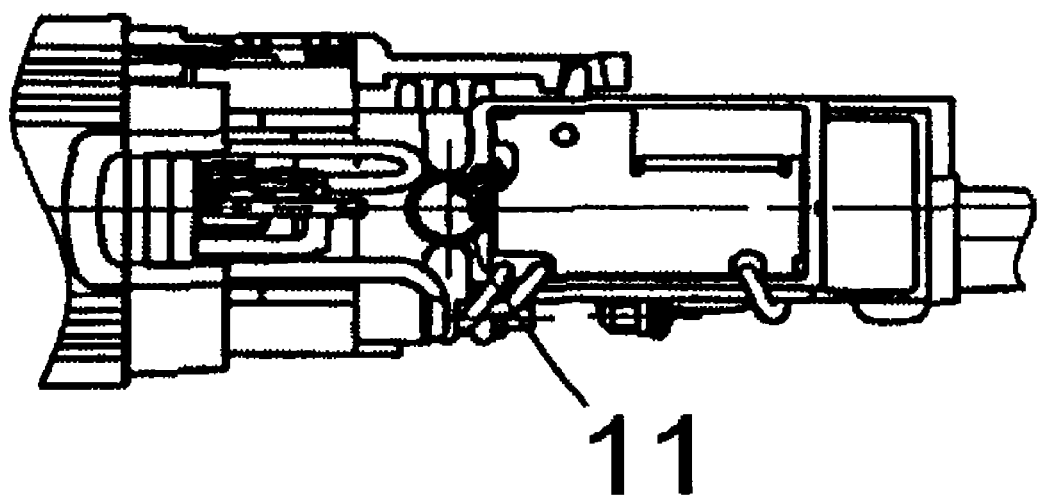
FIG. 6 is an explanatory diagram illustrating a set position of a pick-up coil 11 used in the power tool shown in FIG. 5.
Figure 7:
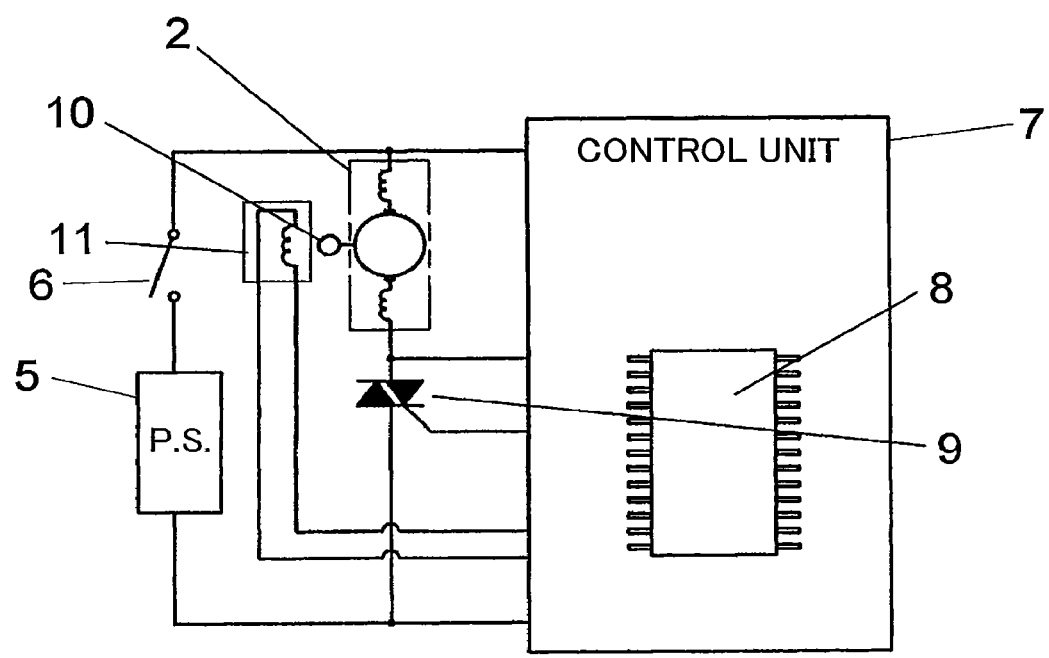
FIG. 7 is a circuit diagram for the power tool shown in FIG. 5.

FIG. 5 is a diagram illustrating an internal structure of a power tool according to a second embodiment of the present invention. FIG. 6 is an explanatory diagram illustrating a set position of a pick-up coil 11 used in the power tool according to the second embodiment. FIG. 7 is a circuit diagram for the power tool according to the second embodiment. Comparing the power tool according to the second embodiment with the power tool according to the first embodiment illustrated in FIGS. 1 and 2, the following differences exist but other points remain the same. The power tool according to the second embodiment is provided with a magnet 10 and the pick-up coil 11 instead of shunt resistor 4 and also detects (monitors) the load using the number of rotations of the motor 2 instead of current flowing in the motor 2. As shown in the characteristic diagram illustrating the relationship between the number of rotations of the motor and current flowing in the motor of the power tool (FIG. 3), current I flowing in the motor 2 can be indirectly detected using the detected number of rotations R of the motor 2. The following description will be focused on the differences.

The magnet 10 is attached to a rear end of the motor 2 and rotates together with the motor 2. The pick-up coil 11 is provided on a side of the magnet 10, and a magnetic field generated by the magnet 10 is applied to the pick-up coil 11. The magnetic field changes periodically in response to the rotations of the motor 2. The control unit 7 detects the number of rotations of the motor 2 using a voltage signal (a pulse wave) outputted from the pick-up coil 11.

Figure 8:
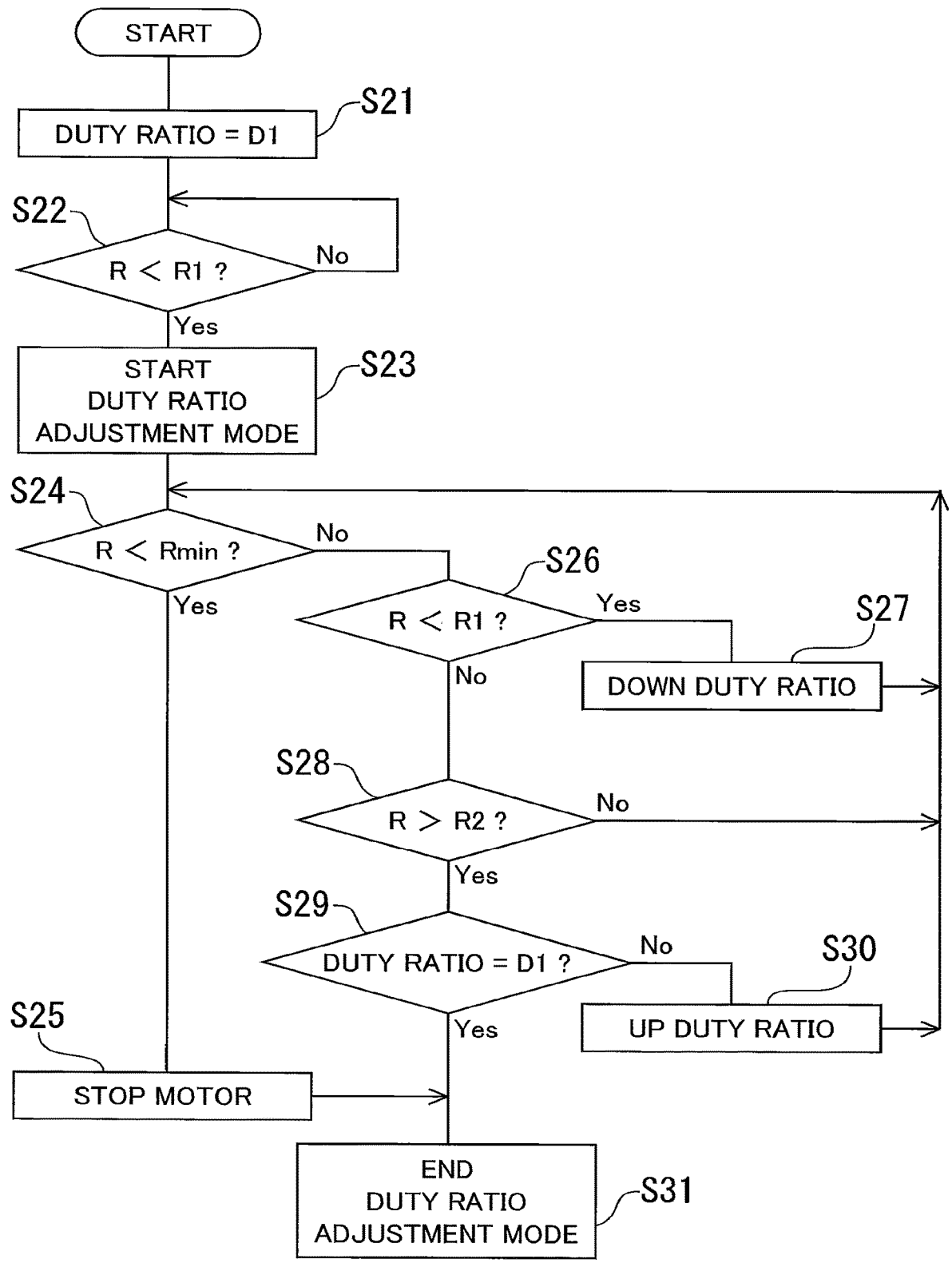
FIG. 8 is a flowchart illustrating a control process for the power tool shown in FIG. 5.

FIG. 8 is a flowchart illustrating steps in control process performed by the power tool illustrated in FIGS. 5 through 7. The steps in control process performed by the control unit 7 will be described below while referring to FIG. 8 as well as FIG. 3.

The switch 6 is rendered on by a user, and then a work is started. The control unit 7 detects (monitors) the number of rotations R of the motor 2 using the voltage signal outputted from the pick-up coil 11 while driving the motor 2 at the duty ratio D1 (S21), and determines whether the number of rotations R is less than R1 or not (S22). R1 corresponds to the number of rotations of the motor in a case where current I (load) flowing in the motor 2 is I1 (the first threshold value) in the present duty ratio. If the duty ratio is D1, a relational expression of R1=RH1 is established. If the duty ratio is D2, a relational expression of R1=RL1 is established.

When the number of rotations R becomes less than R1 (S22: Yes), the control unit 7 starts the duty ratio adjustment mode (S23) because current I (load) exceeds I1 (the first threshold value). When the number of rotations R becomes less than Rmin (S24: Yes), the control unit 7 accords a protection priority over the adjustment of the duty ratio and stops supplying power to the motor 2 (S25) because current I exceeds Imax. Rmin corresponds to the number of rotations of the motor in a case where current I is Imax which is the overload protection threshold value in the present duty ratio. If the duty ratio is D1, a relational expression of Rmin=RHmin is established. If the duty ratio is D2, a relational expression of Rmin=RLmin is established.

If the number of rotations R is not less than Rmin (S24: No), the control unit 7 determines whether the number of rotations R is less than R1 or not (S26). If the number of rotations R is less than (S26: Yes), for example, the duty ratio is decreased from D1 to D2 (S27).

When the number of rotations R exceeds R2 (S28: Yes), the control unit 7 determines whether the duty ratio is D1 or not (S29) because current I is lower than I2 (the second threshold value). If the duty ratio is not D1 (S29: No), for example, the control unit 7 increases the duty ratio from D2 to D1 (S30). R2 corresponds to the number of rotations of the motor in a case where current I (load) flowing in the motor 2 is I2 (the second threshold value) in the present duty ratio. If the duty ratio is D2, a relational expression of R2=RL2 is established. If the duty ratio is D1, a relational expression of R2=RH2 is established. The duty ratio adjustment mode is ended (S31) when the number of rotations R becomes less than Rmin and when the number of rotations R exceeds R2 at the duty ratio D1.

In the second embodiment, the same advantages as those obtained in the first embodiment can also be obtained.

While the present invention has been described in detail with respect to the embodiments thereof as examples, it should be understood by those skilled in the art that various changes and modifications may be made with respect to each of the components and processes in the present embodiments without departing from the scope of the invention. The modification of the present embodiments will be described below.

The power tool is not limited to the grinder but may be a drill or other tools. Also, the power tool may be battery-driven type, the motor 2 may be a DC motor (with brushes or brushless). The duty ratio is not limited to 2 steps of D1 and D2 but may be equal to or more than 3 steps. The upper limit value of the target load range may be lower than the first threshold value I1.

REFERENCE SINGS LIST

1: housing
2: motor
3: spindle
4: shunt resistor
5: power supply
6: switch
7: control unit
8: arithmetic element
9: triac
10: magnet
11: pick-up coil

The invention claimed is:

1. A power tool comprising:
a motor;
a semiconductor device connected to the motor for controlling electric power supplied to the motor; and
a controller configured to:
control the semiconductor device to control the electric power supplied to the motor;
drive the motor in a driving mode having a first characteristic and a second characteristic; and
change the driving mode between at least the first characteristic and the second characteristic, the electric power supplied to the motor in the second characteristic being lower than that in the first characteristic,
wherein, when number of rotations of the motor drops below a first prescribed value due to an increase in a load imposed upon the motor while the controller is driving the motor in the first characteristic, the controller changes the driving mode from the first characteristic to the second characteristic, and
wherein, when the number of rotations exceeds a second prescribed value different from the first prescribed value while the controller is driving the motor in the second characteristic, the controller changes the driving mode from the second characteristic to the first characteristic.

2. The power tool according to claim 1, wherein, when the number of rotations drops below an overload threshold value smaller than the first prescribed value while the controller is driving the motor in the second characteristic, the controller controls the motor so that the rotation of the motor is stopped.

3. The power tool according to claim 1, wherein the controller is further configured to drive the motor in a constant speed mode of maintaining the number of rotations at a constant speed value larger than the first prescribed value.

4. The power tool according to claim 1, wherein the power tool is a grinder comprising a spindle to which a grindstone is attachable, the grindstone attached to the spindle being rotated by rotation of the motor.

5. A power tool comprising:
a motor;
a spindle to which an end tool for processing a workpiece is attachable, the end tool attached to the spindle being rotated by rotation of the motor;
a semiconductor device connected to the motor for controlling a duty ratio of voltage applied to the motor; and
a controller configured to:
control the semiconductor device to change the duty ratio between at least a first duty ratio and a second duty ratio lower than the first duty ratio;
drive the motor in a driving mode; and change the driving mode between at least:
    a first mode in which the controller drives the motor with the first duty ratio so that current flowing through the motor increases as a pressing force pressing the end tool against the workpiece increases; and
    a second mode in which the controller drives the motor with the second duty ratio,
wherein,
    when the current flowing through the motor exceeds a prescribed threshold value while the controller is driving the motor in the first mode, the controller changes the driving mode from the first mode to the second mode and
    wherein, when the current flowing through the motor exceeds an overcurrent threshold value larger than the prescribed threshold value while the controller is driving the motor in the second mode, the controller controls the motor so that rotation of the motor is stopped.

6. The power tool according to claim 5, wherein, when the current flowing through the motor is smaller than or equal to a constant speed threshold value smaller than the prescribed threshold value, the controller drives the motor so as to keep the number of rotations of the motor constant.

7. The power tool according to claim 5, further comprising a resistor for detecting the current flowing through the motor.

8. The power tool according to claim 5, when the current flowing through the motor drops below a second prescribed value different from the prescribed value while the controller is driving the motor in the second mode, the controller changes the driving mode from the second mode to the first mode.

9. A power tool comprising:
a motor;
a semiconductor device connected to the motor for controlling electric power supplied to the motor;
a switch for controlling start and stop of the motor, the switch being configured to be switched on and off by a user; and
a controller configured to:
    control the semiconductor device to control the electric power supplied to the motor;
    drive the motor in a driving mode having a first characteristic and a second characteristic; and
    change the driving mode between at least the first characteristic and the second characteristic, the electric power supplied to the motor in the second characteristic being lower than that in the first characteristic,
wherein, when a number of rotations of the motor drops below a first prescribed value due to an increase in a load imposed upon the motor while the controller is driving the motor in the first characteristic, the controller changes the driving mode from the first characteristic to the second characteristic and continues supplying the electric power to the motor unless the switch is turned off or the load exceeds an overload protection value.

10. A power tool comprising:
a motor;
a semiconductor device connected to the motor for controlling electric power supplied to the motor; and
a controller configured to:
    control the semiconductor device to control the electric power supplied to the motor;
    drive the motor in a driving mode having a first characteristic and a second characteristic; and
    change the driving mode between at least the first characteristic and the second characteristic, the electric power supplied to the motor in the second characteristic being lower than that in the first characteristic,
wherein, when a first condition that number of rotations of the motor drops below a prescribed value due to an increase in a load imposed upon the motor is met while the controller is driving the motor in the first characteristic, the controller changes the driving mode from the first characteristic to the second characteristic, and
wherein, when a second condition different from the first condition is met while the controller is driving the motor in the second characteristic, the controller changes the driving mode from the second characteristic to the first characteristic.

\* \* \* \* \*